(12) United States Patent
Gupta et al.

(10) Patent No.: US 8,385,893 B2
(45) Date of Patent: Feb. 26, 2013

(54) MULTI-SIM STATUS UPDATE SYSTEM

(75) Inventors: Sudhendra K Gupta, Pradesh (IN);
Venkata A Naidu Babbadi, Pradesh (IN); Uttam Pattanayak, Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 12/984,315

(22) Filed: Jan. 4, 2011

(65) Prior Publication Data
US 2012/0172011 A1 Jul. 5, 2012

(51) Int. Cl.
H04M 3/42 (2006.01)
(52) U.S. Cl. .................. 455/414.1; 455/432.1; 455/551; 455/552.1; 455/558; 455/567; 455/412.2; 455/458
(58) Field of Classification Search ............... 455/552.1, 455/551, 558, 556.2, 567, 412.2, 414.1, 432.1, 455/458
See application file for complete search history.

(56) References Cited

U.S. PATENT DOCUMENTS

| | | | |
|---|---|---|---|
| 8,018,865 B2* | 9/2011 | Fan et al. ................ | 370/252 |
| 8,180,400 B2* | 5/2012 | Shin et al. ................ | 455/558 |
| 2003/0125073 A1* | 7/2003 | Tsai et al. ................ | 455/552 |
| 2004/0110489 A1 | 6/2004 | Murri et al. | |
| 2004/0176076 A1 | 9/2004 | Uppuluri | |
| 2005/0075106 A1 | 4/2005 | Jiang | |
| 2006/0094467 A1 | 5/2006 | Kim et al. | |
| 2006/0233338 A1 | 10/2006 | Punaganti Venkata | |
| 2007/0117588 A1* | 5/2007 | Uehara et al. ............ | 455/561 |
| 2007/0129103 A1* | 6/2007 | Al-Shaikh ................ | 455/551 |
| 2008/0207174 A1 | 8/2008 | Murri et al. | |
| 2009/0131054 A1 | 5/2009 | Zhang | |
| 2009/0215490 A1 | 8/2009 | Lee et al. | |
| 2009/0325572 A1* | 12/2009 | Ji .......................... | 455/424 |
| 2011/0070922 A1* | 3/2011 | Kim ........................ | 455/558 |
| 2011/0151842 A1* | 6/2011 | Olincy et al. ............. | 455/414.1 |
| 2012/0028657 A1* | 2/2012 | Chin et al. ............... | 455/458 |
| 2012/0115545 A1* | 5/2012 | Middleton ................ | 455/558 |

FOREIGN PATENT DOCUMENTS
EP 2200264 A1 6/2010

OTHER PUBLICATIONS

3rd Generation Partnership Project; Technical Specification Group Core Network and Terminals; Technical realization of Completion of Calls to Busy Subscriber(CCBS) ; Stage 2 (Release 9) , 3GPP Standard; 3GPP TS 23.093, 3rd Generation Partnership Project (3GPP), Mobile Competence Centre ; 650, Route Deslucioles ; F-06921 Sophia-Antipolis Cedex ; France, No. V9.0.0, Dec. 18, 2009 , pp. 1-164, XP050401100, [ retrieved on Dec. 18, 2009] paragraphs [04.2] '- [05.2] ; figures 4.2.1,5.2.1.
International Search Report and Written Opinion—PCT/US2012/020235—ISA/EPO—May 7, 2012.

* cited by examiner

*Primary Examiner* — Olumide T Ajibade Akonai
(74) *Attorney, Agent, or Firm* — S. Hossain Beladi

(57) ABSTRACT

A particular method includes processing a call connection between a user equipment (UE) device and a first network. The UE device is coupled to or includes at least a first subscriber identity module (SIM) that is associated with the first network and a second SIM that is associated with a second network. The method includes sending a status update message to the second network associated with the second SIM. The status update message instructs the second network to provide a busy status message in response to receiving a call connection request that is directed to the second SIM.

19 Claims, 5 Drawing Sheets

MULTI-SIM STATUS UPDATE SYSTEM

I. FIELD

The present disclosure is generally related to devices that utilize multiple subscriber identity modules (SIMs).

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless telephone that utilizes multiple SIMs (e.g., a dual-SIM device) may be able to communicate with multiple networks. When the wireless telephone is busy on a call associated with one SIM (e.g., a mobile originated (MO) call or a mobile terminated (MT) call), the wireless telephone may not respond to a page associated with another SIM. As such, a network associated with the other SIM may consider the wireless telephone to be unreachable even when the wireless telephone may be reachable and may be located within a wireless coverage area of the network.

III. SUMMARY

In particular embodiment, a method includes processing a call connection between a user equipment (UE) device and a first network associated with a first subscriber identity module (SIM). The method includes sending a status update message to a second network associated with a second SIM of the UE device. The status update message instructs the second network to provide a busy status message in response to receiving a call connection request that is directed to the second SIM.

In another particular embodiment, an apparatus includes a first SIM interface to receive a first SIM, a second SIM interface to receive a second SIM, and call processing logic. The call processing logic may process a call connection between the apparatus and a first network associated with the first SIM and send a status update message to a second network associated with the second SIM. The status update message instructs the second network to provide a busy status message in response to receiving a call connection request that is directed to the second SIM.

In another particular embodiment, an apparatus includes means for interfacing with a first subscriber identity module (SIM) and means for interfacing with a second SIM. The apparatus also include means for processing a call connection between the apparatus and a first network associated with a first SIM. The apparatus further includes means for sending a status update message to a second network associated with the second SIM. The status update message instructs the second network to provide a busy status message in response to receiving a call connection request that is directed to the second SIM.

One particular advantage provided by at least one of the disclosed embodiments is that, when a call is directed to a UE device with multiple SIMs, a calling party may receive a busy status message rather than a message that inaccurately indicates that the called party is unreachable when the called party is busy in a call conversation (e.g., utilizing a first network associated with a first SIM). Further, a second network (e.g., associated with a second SIM) may avoid paging the UE device during the call.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

In a multi-SIM system, when a user equipment (UE) device, such as a wireless telephony device, is busy on a call (e.g., a mobile originated (MO) call or a mobile terminated (MT) call) using one SIM, the UE device may not be able to respond to a page associated with another SIM. For example, a dual-SIM device may include a single shared baseband-radio frequency (BB-RF) processor. When the BB-RF processor is being utilized for a first SIM, the BB-RF processor may not be available to a second SIM. When a network does not receive a response to the page, the network may determine that the UE device is outside of a wireless coverage area. In this case, the network may provide an indication to a calling party that the UE device is not reachable or is outside the wireless coverage area. Thus, the calling party may receive a message that incorrectly indicates that the UE device is unreachable when the UE device is reachable and within the wireless coverage area. The present disclosure describes a method of communicating status update messages to a network, such that the network may inform the calling party that the UE device is busy, rather than unreachable.

Figure 1:
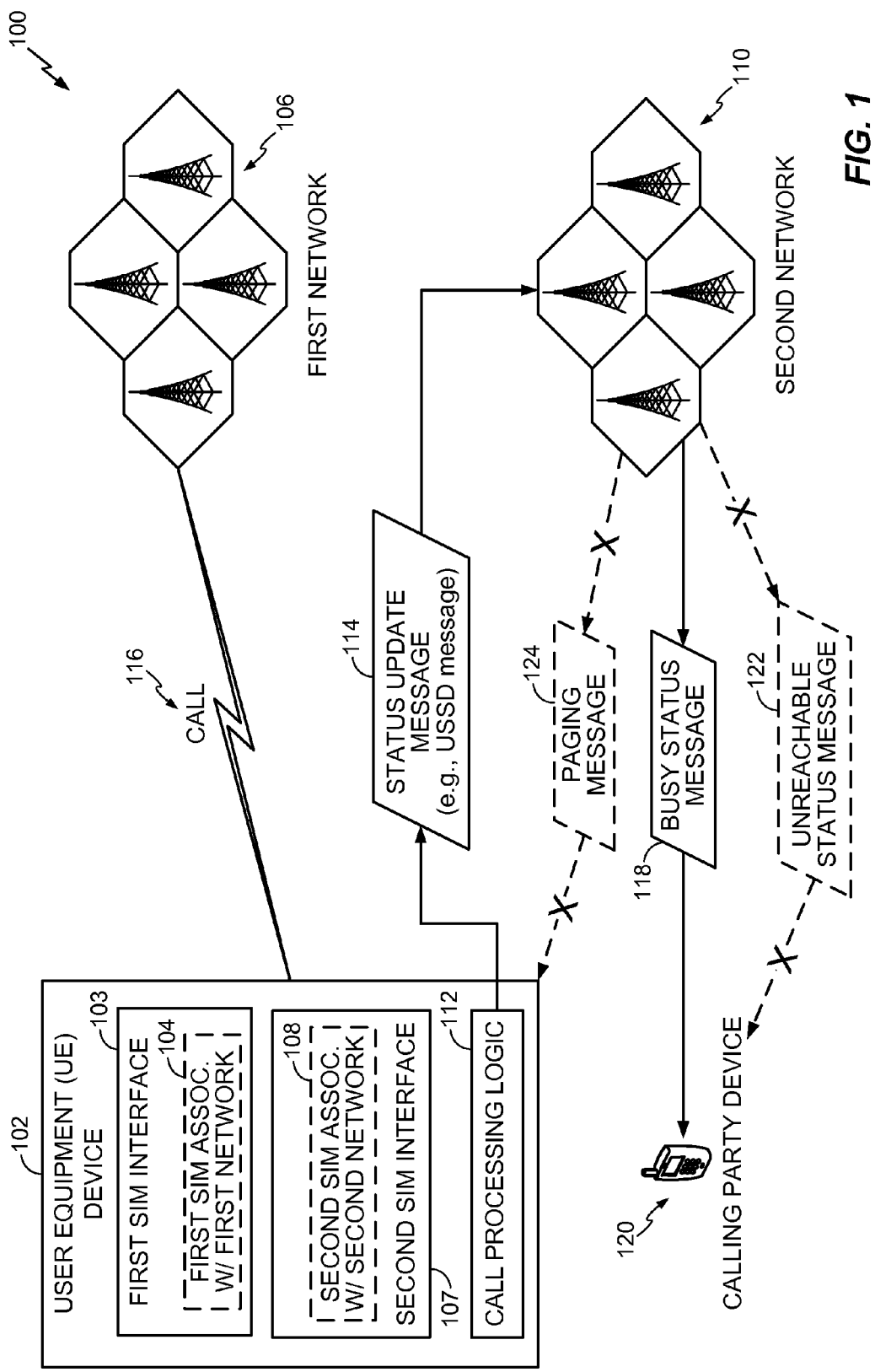
FIG. 1 is a diagram of a first particular illustrative embodiment of a multi-SIM status update system.

Referring to FIG. 1, a multi-SIM status update system is illustrated and is generally designated 100. The system 100 includes a UE device 102 (e.g., a mobile telephone) that is capable of receiving a plurality of SIMs. For example, in the embodiment illustrated in FIG. 1, the UE device 102 is a dual-SIM device that includes a first SIM interface 103 to receive a first SIM 104 that is associated with a first network 106 and a second SIM interface 107 to receive a second SIM 108 that is associated with a second network 110. The UE device 102 also includes call processing logic 112 to communicate a status update message 114 to one or more networks (e.g., to the second network 110) before a call 116 is received or initiated at the UE device 102. While two SIMs 104, 108 are illustrated in FIG. 1, the UE device 102 may be capable of receiving more than two SIMs. In this case, the status update message 114 may be communicated to multiple networks (each associated with a particular SIM). The system 100 of FIG. 1 may enable a network (e.g., the second network 110) to provide a busy status message 118 to a calling party device 120 in response to receiving a call connection request from the calling party device 120 that is directed to the UE device 102.

The call processing logic 112 is configured to process a call connection between the UE device 102 and the first network 106 associated with the first SIM 104. The call processing logic 112 is configured to send the status update message 114 to the second network 110. The status update message 114 instructs the second network 110 to provide the busy status message 118 in response to receiving a call connection request that is directed to the UE device 102 (e.g., a call to the UE device 102 from the calling party device 120 or from another device).

In operation, the call processing logic 112 receives an indication that the call 116 is to be established. For example, the UE device 102 may receive a request to initiate an outgoing call 116 from the UE device 102 to the first network 106. To illustrate, a user of the UE device 102 may select a contact from a contact list or may input a telephone number via a user input device (not shown) of the UE device 102 in order to request the initiation of the outgoing call 116. In this case, the status update message 114 may be sent to the second network 110 prior to initiation of the outgoing call 116. As another example, the UE device 102 may receive a notification of an incoming call 116 from the first network 106. In this case, the status update message 114 may be sent to the second network 110 prior to receipt of the incoming call 116. To illustrate, the status update message 114 may be sent to the second network 110 in response to receipt of the notification (e.g., a paging message from the first network that informs the UE device 102 of the incoming call 116). In a particular embodiment, the status update message 114 is sent to the second network 110 before the UE device 102 responds to the paging message from the first network 106. In another embodiment, the status update message 114 may be sent to the second network 110 at substantially the same time as the UE device 102 responds to the paging message from the first network 106.

The status update message 114 may be communicated using a supplementary service. In a particular embodiment, the status update message 114 includes an unstructured supplementary service data (USSD) message. For example, a USSD string may include a USSD code associated with a busy status (e.g., a call diverting status code "67"). Alternatively, the status update message 114 may be communicated using another mechanism, such as short messaging service (SMS). In a particular embodiment, the status update message 114 may be automatically communicated to the second network 110 within a predetermined period of time after receiving a request to initiate an outgoing call (e.g., a mobile originated (MO) call) or after receiving a notification of an incoming call (e.g., a mobile terminated (MT) call). By automatically sending the status update message 114 without prior receipt of user input at the UE device 102, a delay associated with communication of the status update message 114 may be reduced to avoid disruption or potential disruption of the establishment of the call 116.

The busy status message 118 may be different from an unreachable status message 122 that is provided by the second network 110 when the UE device 102 is not reachable (e.g., out of a wireless coverage area of the second network 110). As an illustrative example, in response to receiving the status update message 114, the second network 110 may provide the calling party device 120 with the message "UE is busy" instead of "UE is not reachable." Thus, when the UE device 102 is reachable and within a wireless coverage area of the second network 110, the calling party device 120 may not receive an inaccurate message (e.g., the unreachable status message 122). In a particular embodiment, the second network 110 is a Global System for Mobile Communications (GSM) network, and the status update message 114 is conveyed to a home location register (HLR) to be stored in association with an identifier of the UE device 102. For example, a subscriber status code (e.g., a busy status code) may be stored in a SUBSCRIBER_STATUS field by the HLR in association with an International Mobile Subscriber Identity (IMSI) of a subscriber associated with the UE device 102.

In a particular embodiment, the busy status message 118 is stored at the second network 110 and may be a default message or may be configured by a user of the UE device 102. For example, a default busy status message 118 may be that the "UE is busy." The user of the UE device 102 may customize the busy status message 118 to provide a pre-recorded message to the calling party device 120 (e.g., "I am currently on a call that uses my other SIM card, but my phone is turned on, please call me later"). In an alternative embodiment, the calling party device 120 may be directed to voice mail in order to leave a message to be delivered to the UE device 102 after completion of the call 116. In this case, the busy status message 118 may provide the calling party device 120 with an option to leave a message for subsequent delivery (e.g., a default voice mail message or a customized message).

The call processing logic 112 may send a second status update message (not shown) to the second network 110 in response to termination of the call 116 (e.g., in response to one of the parties ending the call 116 or in response to call failure). The second status update message may inform the second network 110 of the termination of the call 116. In response to receiving the second status update message, the second network 110 may no longer provide the busy status message 118 in the event that a call is received that is directed to the UE device 102. Further, in the case where the calling party device 120 left a message for subsequent delivery to the UE device 102, the second network 110 may provide an indication to the UE device 102 of the stored message. In a particular embodiment, another subscriber status code (e.g., an active status code) may be stored in the SUBSCRIBER_STATUS field by the HLR of the second network 110 in response to receipt of the indication of the termination of the call 116. When the SUBSCRIBER_STATUS field indicates that the UE device 102 is not busy, paging operations from the second network 110 may resume. For example, in response to receiving a call connection request from the calling party device 120, the second network 110 may send a paging message 124 to the UE device 102 notifying the UE device 102 of an incoming call from the calling party device 120.

FIG. 1 further illustrates that when the SUBSCRIBER_STATUS field indicates that the UE device 102 is busy, the UE device 102 may not receive the paging message 124 from the second network 110 in response to the second network 110 receiving a call connection request that is directed to the UE device 102. An operator or service provider associated with the second network 110 may utilize this information for planning and optimization. For example, expenses associated with paging the UE device 102 from a base station of the second network 110 may be reduced. In an alternative embodiment, each of the SIMs 104, 108 of the dual-SIM UE device 102 may be associated with its own dedicated BB-RF processor. In this case, while the UE device 102 may be capable of simultaneously receiving and processing pages from different networks, the status update message 114 may enable the networks 106, 110 to avoid sending the paging message 124 to the UE device 102. Thus, the system 100 of FIG. 1 may enable the second network 110 to avoid wasting signaling resources (e.g., network bandwidth) associated with the attempted setup of a call from the calling party device 120 to the UE device 102.

Figure 2:
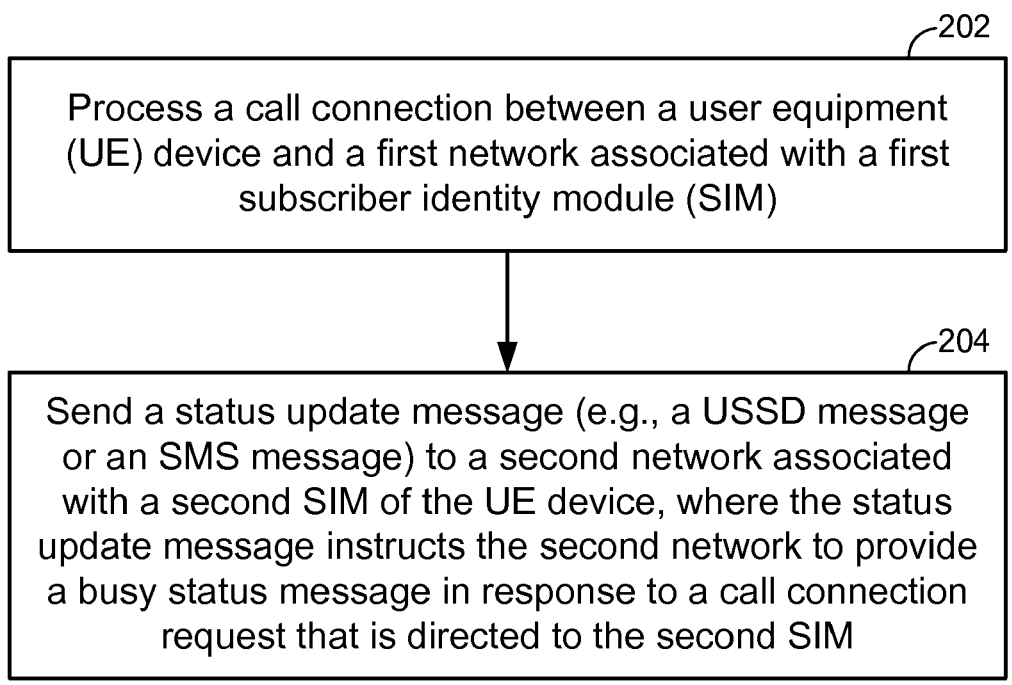
FIG. 2 is a flow chart of a first illustrative embodiment of a multi-SIM status update method.

Referring to FIG. 2, a particular embodiment of a multi-SIM status update method is illustrated. The method of FIG. 2 may enable a network to provide a busy status message rather than an unreachable status message to a calling party.

The method includes processing a call connection between a UE device and a first network associated with a first SIM, at 202. The first SIM may be associated with a first network. For example, the UE device may be the UE device 102 of FIG. 1 that receives the first SIM 104 associated with the first network 106 and the second SIM 108 associated with the second network 110.

The method includes sending a status update message to a second network associated with a second SIM of the UE device, at 204. The status update message instructs the second network to provide a busy status message in response to receiving a call connection request that is directed to the second SIM. For example, the UE device 102 of FIG. 1 may send the status update message 114 to the second network 110 to instruct the second network 110 to provide the busy status message 118 in response to receiving a call connection request that is directed to the second SIM 108 of the UE device 102 (e.g., a call from the calling party device 120).

Figure 3:
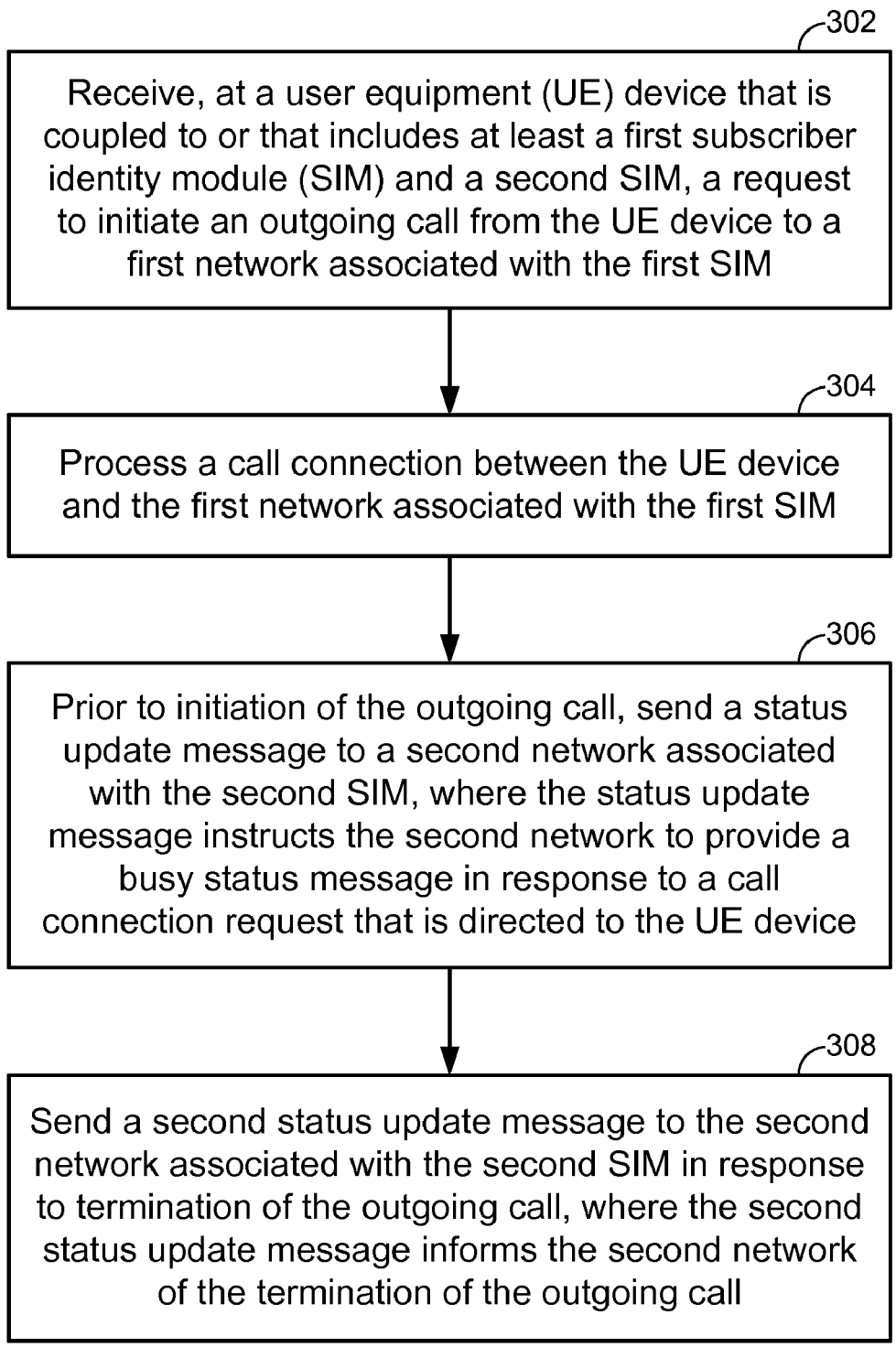
FIG. 3 is a flow chart of a second illustrative embodiment of a multi-SIM status update method.

In one embodiment, a request is received to initiate an outgoing call from the UE device to the first network associated with the first SIM (see FIG. 3). In this case, the status update message may be sent to the second network associated with the second SIM prior to initiation of the outgoing call. In another embodiment, the UE device receives a notification of an incoming call from the first network associated with the first SIM (see FIG. 4). In this case, the status update message may be sent to the second network associated with the second SIM prior to receipt of the incoming call.

Referring to FIG. 3, another particular embodiment of a multi-SIM status update method is illustrated. In the embodiment illustrated in FIG. 3, a UE device (e.g., the UE device 102 of FIG. 1) receives a request to initiate an outgoing call. Prior to initiation of the outgoing call, a status update message may be sent to a network in order to enable the network to provide a busy status message rather than an unreachable status message to a calling party.

The method includes receiving, at a UE device that is coupled to or that includes at least a first SIM and a second SIM, a request to initiate an outgoing call from the UE device to a first network associated with the first SIM, at 302. For example, the UE device 102 of FIG. 1 may receive a request to initiate the call 116 to the first network 106 associated with the first SIM 104.

The method includes processing a call connection between the UE device and the first network associated with the first SIM, at 304. Prior to initiation of the outgoing call, a status update message (e.g., a first USSD message) is sent to a second network associated with the second SIM, at 306. For example, prior to initiation of the call 116, the UE device 102 of FIG. 1 may send the status update message 114 to the second network 110. The status update message 114 instructs the second network 110 to provide the busy status message 118 in response to receiving a call connection request that is directed to the UE device 102 (e.g., a request from the calling party device 120 to setup a call between the calling party device 120 and the UE device 102).

The method includes sending a second status update message (e.g., a second USSD message) to the second network associated with the second SIM in response to termination of the outgoing call, at 308. For example, the UE device 102 of FIG. 1 may send a second status update message (not shown in FIG. 1) to the second network 110. The second status update message informs the second network 110 of the termination of the outgoing call 116. In a particular embodiment, the second network 110 may provide the busy status message 118 (e.g., the "UE is busy") until the second status update message is received. Further, when a call from the calling party device 120 is received at the second network 110, the second network 110 may not send the paging message 124 to the UE device 102 until the second status update message is received.

Figure 4:
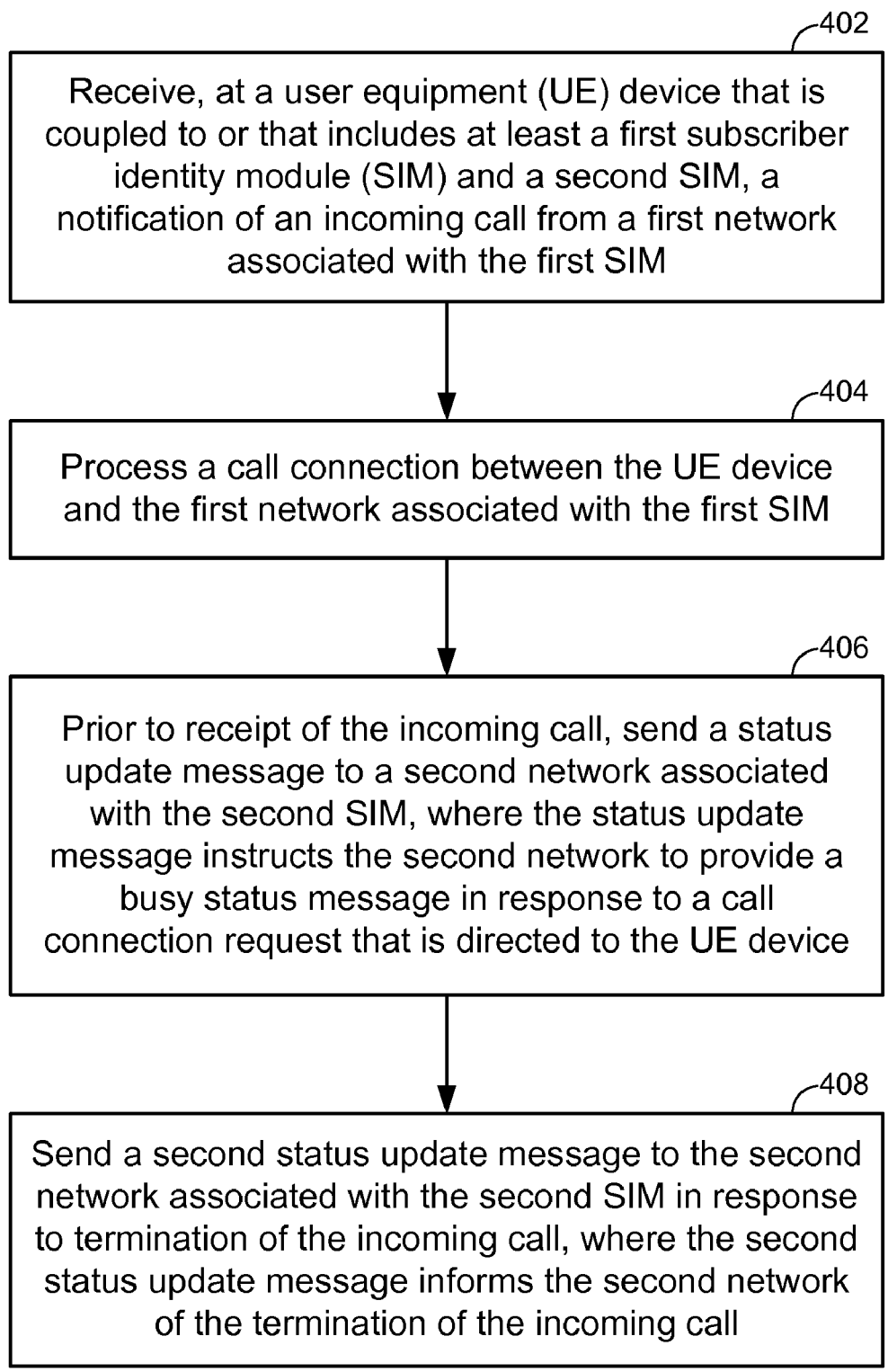
FIG. 4 is a flow chart of a third illustrative embodiment of a method of multi-SIM status update method.

Referring to FIG. 4, another particular embodiment of a multi-SIM status update method is illustrated. In the embodiment illustrated in FIG. 4, a UE device (e.g., the UE device 102 of FIG. 1) receives a notification of an incoming call. Prior to receipt of the incoming call, a status update message may be sent to a network in order to enable the network to provide a busy status message rather than an unreachable status message to a calling party.

The method includes receiving, at a UE device that is coupled to at least a first SIM and a second SIM, a notification of an incoming call from a first network associated with the first SIM, at 402. For example, the UE device 102 of FIG. 1 may receive a notification of the incoming call 116 from the first network 106 associated with the first SIM 104.

The method includes processing a call connection between the UE device and the first network associated with the first SIM, at 404. Prior to receipt of the incoming call, a status update message (e.g., a first USSD message) is sent to a second network associated with the second SIM, at 406. For example, prior to receipt of the incoming call 116, the status update message 114 may be sent to the second network 110. The status update message 114 instructs the second network 110 to provide the busy status message 118 in response to a call connection request that is directed to the UE device 102 (e.g., a call to the UE device 102 from the calling party device 120).

The method includes sending a second status update message (e.g., a second USSD message) to the second network associated with the second SIM in response to termination of the incoming call, at 408. For example, the UE device 102 of FIG. 1 may send a second status update message (not shown in FIG. 1) to the second network 110. The second status update message informs the second network 110 of the termination of the incoming call 116. In a particular embodiment, the second network 110 may provide the busy status message 118 (e.g., the "UE is busy") until the second status update message is received. Further, when a call from the calling party device 120 is received, the second network 110 may not send the paging message 124 to the UE device 102 until the second status update message is received.

Figure 5:
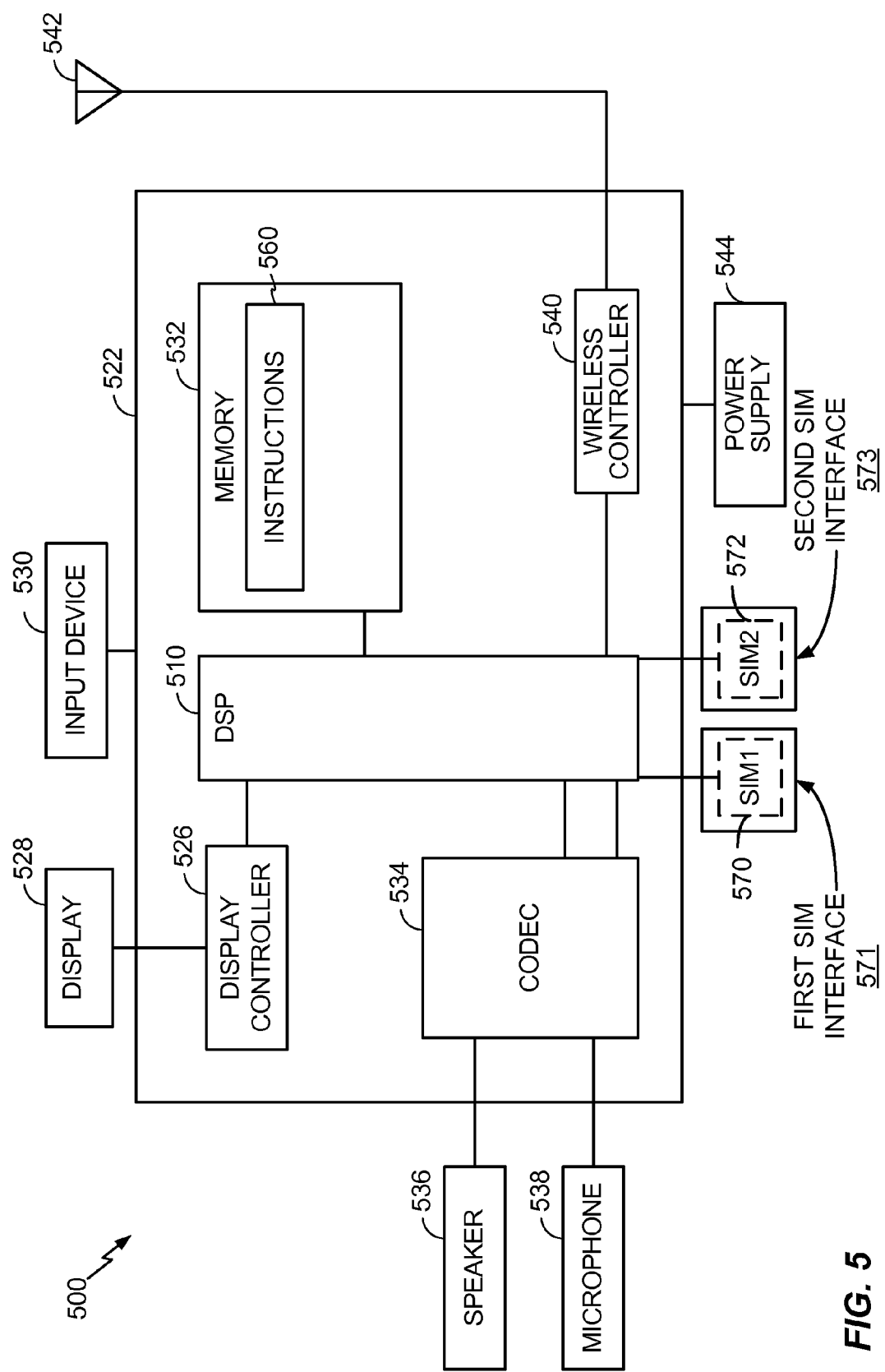
FIG. 5 is a block diagram of a user equipment (UE) device that includes multiple SIMs and logic to communicate status update messages to the associated networks.

Referring to FIG. 5, a block diagram of a particular illustrative embodiment of a portable electronic device is depicted and generally designated 500. In one embodiment, the portable electronic device 500 of FIG. 5 includes or is included within the UE device 102 of FIG. 1. Further, all or part of the methods described in FIGS. 2-4 may be performed at the portable electronic device 500 of FIG. 5. The portable electronic device 500 includes a processor, such as a digital signal processor (DSP) 510, coupled to a memory 532.

The memory 532 is a non-transitory tangible computer readable storage medium that stores instructions 560. The instructions 560 may be executable by the DSP 510. For example, the instructions 560 may include instructions to process a call connection between the portable electronic device 500 and a first network (not shown in FIG. 5) associated with a first SIM 570 (that may be coupled to the portable electronic device 500 via a first SIM interface 571). For example, the call connection may be processed in response to receiving a request to initiate an outgoing call or in response to a notification of an incoming call. The instructions 560 may further include instructions to send a status update message to a second network (not shown in FIG. 5) associated with a second SIM 572 (that may be coupled to the portable electronic device 500 via a second SIM interface 573). In a particular embodiment, the memory 532 stores the busy status message (e.g., the "UE is busy") that may be included in the status update message. Alternatively, the busy status message may be stored at the network and retrieved in response to receiving the status update message from the portable electronic device 500. The instructions 560 may further include instructions to send a second status update message to the second network associated with the second SIM 572 in response to termination of the call.

FIG. 5 also shows a display controller 526 that is coupled to the digital signal processor 510 and to a display device 528. A coder/decoder (CODEC) 534 can also be coupled to the digital signal processor 510. A speaker 536 and a microphone 538 can be coupled to the CODEC 534. FIG. 5 also indicates that a wireless controller 540 can be coupled to the digital signal processor 510 and to a wireless antenna 542. In a particular embodiment, the DSP 510, the display controller 526, the memory 532, the CODEC 534, and the wireless controller 540 are included in a system-in-package or system-on-chip device 522. In a particular embodiment, an input device 530 and a power supply 544 are coupled to the system-on-chip device 522. Moreover, in a particular embodiment, as illustrated in FIG. 5, the display device 528, the input device 530, the speaker 536, the microphone 538, the wireless antenna 542, the power supply 544, the first SIM 570, the first SIM interface 571, the second SIM 572, and the second SIM interface 573 are external to the system-on-chip device 522. However, each of the display device 528, the input device 530, the speaker 536, the microphone 538, the wireless antenna 542, the power supply 544, the first SIM 570, the first SIM interface 571, the second SIM 572, and the second SIM interface 573 can be coupled to a component of the system-on-chip device 522, such as an interface or a controller.

In a particular embodiment, the DSP 510 performs the function of processing a call connection between the portable electronic device 500 and a first network associated with the first SIM 570. The wireless controller 540 may perform the function of sending a status update message to a second network associated with the second SIM 572 (e.g., via the wireless antenna 542). The status update message may instruct the second network to provide the busy status message in response to receiving a call connection request that is directed to the second SIM 572.

In a particular embodiment, the DSP 510 may process the call connection in response to receipt of a request to initiate an outgoing call. In this case, the display 520, the input device 530, the microphone 538, or a combination thereof, may perform the function of receiving the request to initiate the outgoing call. For example, the display 520 may be a touchscreen display to receive a selection of a contact from a contact list or to receive a telephone number. As another example, the request to initiate the outgoing call may be in the form of a voice command received via the microphone 538. The wireless controller 540 may perform the function of sending a status update message to the second network associated with the second SIM 572 (e.g., via the wireless antenna 542) prior to initiation of the outgoing call. The wireless controller 540 may perform the function of sending a second status update message to the second network associated with the second SIM 572 (e.g., via the wireless antenna 542) in response to termination of the outgoing call. The second status update message may inform the second network of the termination of the outgoing call.

In another particular embodiment, the DSP 510 may process the call connection in response to receipt of a notification of an incoming call from the first network associated with the first SIM 570. The wireless controller 540 may perform the function of receiving the notification of the incoming call (e.g., via the wireless antenna 542). The wireless controller 540 may perform the function of sending a status update message to the second network associated with the second SIM 572 (e.g., via the wireless antenna 542) prior to receipt of the incoming call. The wireless controller 540 may perform the function of sending a second status update message to the second network associated with the second SIM 572 (e.g., via the wireless antenna 542) in response to termination of the incoming call. The second status update message may inform the second network of the termination of the incoming call.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
processing a call connection between a user equipment (UE) device and a first network associated with a first subscriber identity module (SIM); and
sending a status update message to a second network associated with a second SIM of the UE device, wherein the status update message instructs the second network to provide a busy status message in response to receiving a call connection request that is directed to the second SIM, wherein, after sending the status update message, the UE device does not receive a paging message from the second network in response to the second network receiving the call connection request that is directed to the second SIM.

2. The method of claim 1, wherein the busy status message is different from an unreachable status message provided by the second network when the UE device is not reachable.

3. The method of claim 1, wherein the call connection is processed in response to receipt of a request to initiate an outgoing call from the UE device to the first network associated with the first SIM, and wherein the status update message is sent to the second network associated with the second SIM prior to initiation of the outgoing call.

4. The method of claim 3, further comprising sending a second status update message to the second network associated with the second SIM in response to termination of the outgoing call, wherein the second status update message informs the second network of the termination of the outgoing call, wherein, after sending the second status update message, the UE device receives a paging message from the second network in response to the second network receiving a call connection request that is directed to the second SIM.

5. The method of claim 1, wherein the call connection is processed in response to receipt of a notification of an incoming call from the first network associated with the first SIM, and wherein the status update message is sent to the second network associated with the second SIM prior to receipt of the incoming call.

6. The method of claim 5, further comprising sending a second status update message to the second network associated with the second SIM in response to termination of the incoming call, wherein the second status update message informs the second network of the termination of the incoming call, wherein, after sending the second status update message, the UE device receives a paging message from the second network in response to the second network receiving a call connection request that is directed to the second SIM.

7. The method of claim 1, wherein the status update message is communicated using one of a supplementary service and a short messaging service.

8. The method of claim 1, wherein the status update message includes one of an unstructured supplementary service data (USSD) message and a short messaging service (SMS) message.

9. An apparatus, comprising:
a first subscriber identity module (SIM) interface to receive a first SIM;
a second SIM interface to receive a second SIM; and
call processing logic to:
process a call connection between the apparatus and a first network associated with the first SIM; and
send a status update message to a second network associated with the second SIM, wherein the status update message instructs the second network to provide a busy status message in response to receiving a call connection request that is directed to the second SIM, wherein, after sending the status update message, the apparatus does not receive a paging message from the second network in response to the second network receiving the call connection request that is directed to the second SIM.

10. The apparatus of claim 9, wherein the call processing logic processes the call connection in response to receipt of a request to initiate an outgoing call from the apparatus to the first network associated with the first SIM, wherein the status update message is sent prior to initiation of the outgoing call, wherein the call processing logic sends a second status update message to the second network associated with the second SIM in response to termination of the outgoing call, wherein the second status update message informs the second network of the termination of the outgoing call, wherein, after sending the second status update message, the apparatus receives a paging message from the second network in response to the second network receiving a call connection request that is directed to the second SIM.

11. The apparatus of claim 10, wherein the status update message includes a first unstructured supplementary service data (USSD) message, and wherein the second status update message includes a second USSD message.

12. The apparatus of claim 9, wherein the call processing logic processes the call connection in response to receipt of a notification of an incoming call from the first network associated with the first SIM, wherein the status update message is sent prior to receipt of the incoming call, wherein the call processing logic sends a second status update message to the second network associated with the second SIM in response to termination of the incoming call, wherein the second status update message informs the second network of the termination of the incoming call, wherein, after sending the second status update message, the apparatus receives a paging message from the second network in response to the second network receiving a call connection request that is directed to the second SIM.

13. The apparatus of claim 12, wherein the status update message includes a first unstructured supplementary service data (USSD) message, and wherein the second status update message includes a second USSD message.

14. An apparatus, comprising:
means for interfacing with a first subscriber identity module (SIM);
means for interfacing with a second SIM;
means for processing a call connection between the apparatus and a first network associated with the first SIM; and
means for sending a status update message to a second network associated with the second SIM, wherein the status update message instructs the second network to provide a busy status message in response to receiving a call connection request that is directed to the second SIM, wherein, after sending the status update message, the apparatus does not receive a paging message from the second network in response to the second network receiving the call connection request that is directed to the second SIM.

15. The apparatus of claim 14, further comprising:
means for receiving a request to initiate an outgoing call from the apparatus to the first network associated with the first SIM, wherein the call connection is processed in response to receipt of the request to initiate the outgoing call, and wherein the status update message is sent to the second network associated with the second SIM prior to initiation of the outgoing call; and means for sending a second status update message to the second network associated with the second SIM in response to termination of the outgoing call, wherein the second status update message informs the second network of the termination of the outgoing call, wherein, after sending the second status update message, the apparatus receives a paging message from the second network in response to the second network receiving a call connection request that is directed to the second SIM.

16. The apparatus of claim 14, further comprising:

means for receiving a notification of an incoming call from the first network associated with the first SIM, wherein the call connection is processed in response to receipt of the notification of the incoming call, and wherein the status update message is sent to the second network associated with the second SIM prior to receipt of the incoming call; and means for sending a second status update message to the second network associated with the second SIM in response to termination of the incoming call, wherein the second status update message informs the second network of the termination of the incoming call, wherein, after sending the second status update message, the apparatus receives a paging message from the second network in response to the second network receiving a call connection request that is directed to the second SIM.

17. A computer readable tangible medium comprising instructions that, when executed by a processor, cause the processor to:

process a call connection between an apparatus and a first network associated with a first subscriber identity module (SIM); and send a status update message to a second network associated with a second SIM of the apparatus, wherein the status update message instructs the second network to provide a busy status message in response to a call connection request that is directed to the second SIM, wherein, after sending the status update message, the apparatus does not receive a paging message from the second network in response to the second network receiving the call connection request that is directed to the second SIM.

18. The computer readable tangible medium of claim 17, further comprising instructions that, when executed by the processor, cause the processor to:

receive a request to initiate an outgoing call from the apparatus to the first network associated with the first SIM, wherein the call connection is processed in response to receipt of the request to initiate the outgoing call, and wherein the status update message is sent to the second network associated with the second SIM prior to initiation of the outgoing call; and send a second status update message to the second network associated with the second SIM in response to termination of the outgoing call, wherein the second status update message informs the second network of the termination of the outgoing call, wherein, after sending the second status update message, the apparatus receives a paging message from the second network in response to the second network receiving a call connection request that is directed to the second SIM.

19. The computer readable tangible medium of claim 17, further comprising instructions that, when executed by the processor, cause the processor to:

receive a notification of an incoming call from the first network associated with the first SIM, wherein the call connection is processed in response to receipt of the notification of the incoming call, and wherein the status update message is sent to the second network associated with the second SIM prior to receipt of the incoming call; and send a second status update message to the second network associated with the second SIM in response to termination of the incoming call, wherein the second status update message informs the second network of the termination of the incoming call, wherein, after sending the second status update message, the apparatus receives a paging message from the second network in response to the second network receiving a call connection request that is directed to the second SIM.

* * * * *